United States Patent [19]
Calvin

[11] 3,844,888
[45] Oct. 29, 1974

[54] HELICAL FLOW DEFLECTOR CONE FOR FUEL ELEMENT ASSEMBLIES

[75] Inventor: John N. Calvin, West Simsbury, Conn.

[73] Assignee: Combustion Engineering Inc., Windsor, Conn.

[22] Filed: Jan. 4, 1971

[21] Appl. No.: 103,454

[52] U.S. Cl.................... 176/78, 239/463, 239/501
[51] Int. Cl............................................. G21c 3/30
[58] Field of Search ................... 176/78, 73, 75, 76; 239/463, 483, 501

[56] References Cited
UNITED STATES PATENTS

| | | | |
|---|---|---|---|
| 3,070,537 | 12/1962 | Treshow ............................... | 176/78 |
| 3,344,855 | 10/1967 | Clark .................................... | 176/78 X |
| 3,379,619 | 4/1968 | Andrews et al..................... | 176/76 X |
| 3,393,128 | 7/1968 | Obertelli et al...................... | 176/78 |
| 3,395,077 | 7/1968 | Long Sun Tong et al............ | 176/78 |
| 3,439,737 | 4/1969 | Boorman et al.................... | 176/78 X |

Primary Examiner—Carl D. Quarforth
Assistant Examiner—P. K. Pavey
Attorney, Agent, or Firm—Harris G. Luther

[57] ABSTRACT

A flow deflector for cooling fluid flowing longitudinally in channels between spaced parallel nuclear fuel reactor elements positioned laterally by intersecting grid elements. The deflectors comprise conical structures positioned at the intersections of said elements with their apexes pointed upstream in the channels and having deflecting surfaces terminating at different downstream positions, each surface having one side longer and at a smaller angle to the flow than the other to deflect the flow laterally toward, across and spirally around the fuel elements and spirally in the opposite rotary direction in the channels.

4 Claims, 11 Drawing Figures

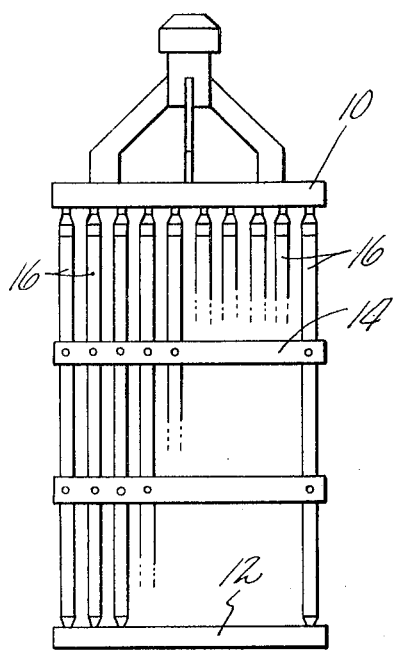
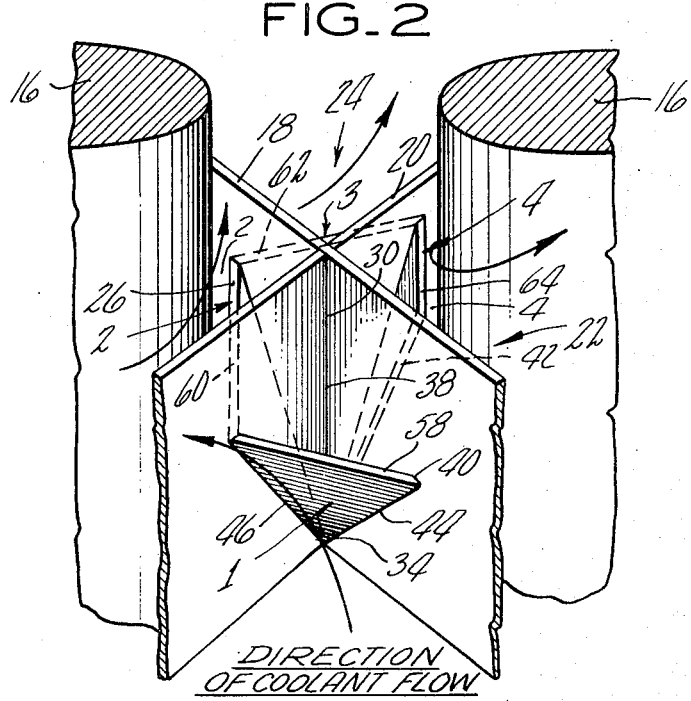
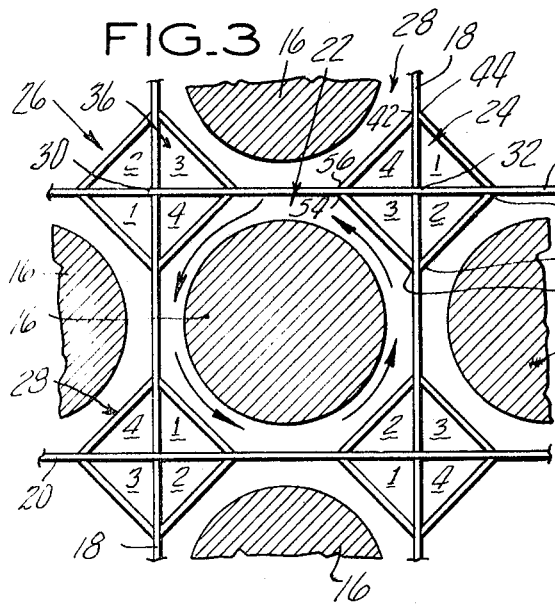
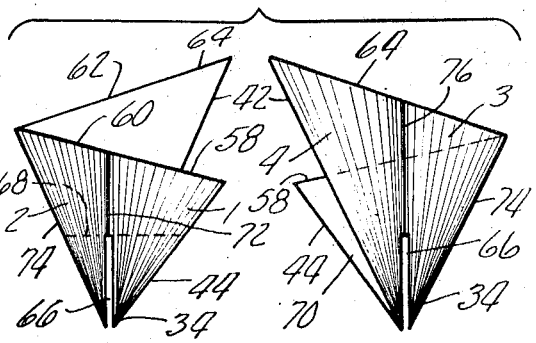
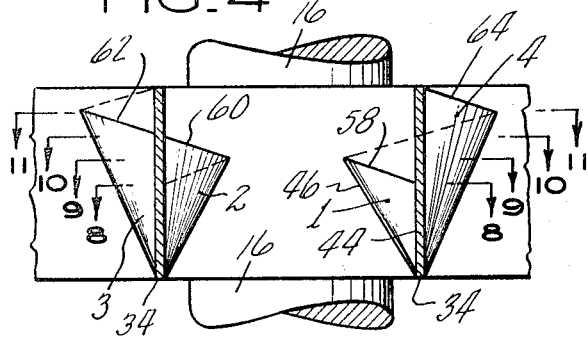
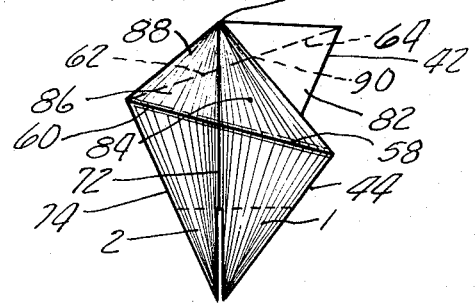

INVENTOR
JOHN N. CALVIN

BY  ATTORNEY

HELICAL FLOW DEFLECTOR CONE FOR FUEL ELEMENT ASSEMBLIES

BACKGROUND OF THE INVENTION

The fuel or fissionable material for nuclear reactors is conventionally in the form of fuel elements or rods which are in turn grouped together in the reactors in bundles comprising fuel element assemblies. An elongated support means in the fuel assembly is provided to vertically support the fuel elements or rods. A plurality of longitudinally spaced grids extend across and are secured to elongated support means. The fuel rods, in turn, extend in a parallel array through openings in the grids and are vertically supported by the bottom end portion of the support means. Each grid has means for laterally positioning the fuel rods. Each reactor has a number of such fuel element assemblies therein comprising the reactor core. The liquid moderator-coolant, normally water, flows upwardly through the reactor core in the channels between the fuel elements to remove heat. Reference may be made to U.S. Pat. No. 3,379,619 issued Apr. 23, 1968 to Andrews and Vespd for a more detailed showing of a typical assembly.

One of the operating limitations on current reactors is established by the onset of film boiling on the surfaces of the fuel elements. This phenomena is commonly described qualitatively as departure from nucleate boiling (DNB) and quantitatively in terms of the amount of heat flux existing when the DNB occurs (critical heat flux or CHF). This condition is affected by the fuel element spacing, the system pressure, the heat flux, the coolant enthalpy and the coolant velocity. When DNB occurs, there is a rapid rise in the temperature of the adjacent fuel element due to the reduced heat transfer which could result in a failure of the element. Therefore, in order to maintain a factor of safety, the reactor must be operated a certain margin below CHF and the point at which DNB occurs. This margin is referred to as the "thermal margin."

Nuclear reactors normally have regions in the core which have a higher neutron flux and power density than other regions. This may be caused by a number of factors, one of which is the presence of control rod channels in the core. When the control rods are withdrawn, the control rod channels are filled with moderator which increases the local moderating capacity and thereby increases the power generated in the adjacent fuel. In these regions of high power density, known as "hot channels," there is a higher rate of coolant enthalpy rise than in other channels. It is such hot channels that set the maximum operating condition for the reactor and limit the amount of power that can be generated since it is in these channels that the critical thermal margin would be reached first.

SUMMARY OF THE INVENTION

It has been found that coolant flow inclined to the fuel elements and coolant flow circulating around the fuel elements will result in a higher value for the critical heat flux than parallel flow probably because such inclined flow inhibits the formation of steam bubbles and superheated water layers or voids which are found to exist over the fuel element surface just prior to DNB in the presence of parallel flow. It has also been found that mixing vanes or flow deflectors or flow twisters placed in the coolant flow channels of a reactor core will mix coolant from various channels and thus tend to reduce the effect of hot channels. The mixing lowers the high coolant enthalpy rise in the hot channels and tends to average out the enthalpy rise over the entire core cross section. Both effects mean that the reactor can be operated at a higher power level and still maintain a safe thermal margin.

A disadvantage of the deflectors is that they form an obstruction or resistance to the free flow of cooling fluid and cause an increase in pressure drop through the reactor. In order to minimize this adverse effect of the deflectors the deflector cones in the present invention are arranged so that the individual deflecting surfaces in any one flow channel or any one opening in the grid have their maximum projection into the fluid flow at different levels or downstream positions. Thus the obstruction to flow is less than would be the case where all of the deflectors have their maximum projections at the same downstream cross section.

The individual deflector surfaces are also arranged so that one side is at a greater angle to the flow than the other so that flow passing over the surface is directed in a spiral.

It is therefore an object of the present invention to provide novel improved coolant flow deflectors and twisters in the reactor core.

Another object is to provide deflectors with the maximum projection into the flow stream at different downstream positions to provide a minimum of flow resistance.

Another object of the invention is improved flow deflectors which will effectively twist the coolant flow and cause disturbance of the coolant flow adjacent the surfaces of the fuel elements as well as cause mixing of the coolant among adjacent channels.

Briefly the objects of the invention are accomplished by providing coolant flow deflectors generally of a conical or pyramidal shape with sides of different angular inclination arranged in sequence in an opening through a grid and around a fuel rod or in a flow channel between fuel rods, such that the flow will be diverted from the centers of the flow channels against or toward the adjacent fuel element and also spirally around said element while providing a minimum of flow resistance through the flow channels.

These and other objects and advantages of the present invention will become apparent when considered in view of the following detailed description and annexed drawings.

BRIEF DESCRIPTION OF THE DRAWINGS

FIG. 1 is an elevation of a fuel assembly including grids on which the deflector-twisters of this invention are mounted.

FIG. 2 is an isometric view partially in section of a helical cone of the invention positioned at the intersection of a grid in a flow channel between the fuel rods with the fuel rods passing through openings in the grid.

FIG. 3 is a plan view partially in section of the structure of FIG. 2.

FIG. 4 is a front elevation view partially in section of FIG. 3.

FIG. 5 is two side views one looking at deflecting surfaces 1 and 2 and the other at deflecting surfaces 3 and 4 of a slotted cone of sheet material.

FIG. 7 is a side view of a solid helical cone with a modified base.

DESCRIPTION OF THE PREFERRED EMBODIMENT

Figure 6:
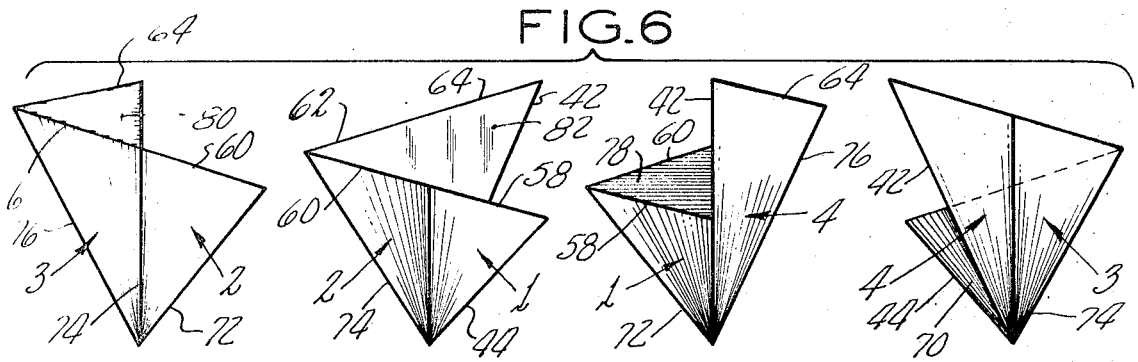
FIG. 6 is a series of four side views showing the four sides of a solid helical cone of the invention.

A nuclear fuel assembly may comprise an upper end fitting 10 connected with a lower end fitting 12 by elongated supports or thimbles (not shown). Between the two fittings may be a plurality of spaced spacer grids 14 which may be secured to the supports or thimbles to hold them in position. Fuel rods 16 may be inserted through the upper fitting and through openings in the grid and down onto the lower end fitting which supports them. The spaced fuel rods 16 define channels 24 between the rods through which a cooling fluid, which may be water and may be pressurized, is forced. The core of a nuclear reactor is formed from a plurality of such fuel assemblies and it is in such assemblies that the coolant flow deflectors and twisters of the present invention are incorporated. The reactor coolant flows up through apertures in the lower end fitting 12 and upwardly through the grids 14, along the elongated fuel elements 16 and out through the upper end fitting 10. The grid strips 18 and 20 intersect in the coolant flow channels 24 and the coolant flow unless disturbed will be generally parallel to the elongated fuel rod. It is this upward parallel coolant flow through the fuel assemblies which is distributed and deflected and twisted in this invention.

The coolant flow deflectors and twisters may be mounted on the spacer grids 14 preferably at the intersections 30, 32 of the strips 18 and 20. The spacer grids are located at intervals along the length of the fuel assembly as shown in FIG. 1. These grids may be for the sole purpose of supporting the deflectors as shown in FIG. 1 or they may be for the additional purpose of spacing and holding the fuel elements.

FIG. 2 illustrates two fuel rods 16 located or passing through openings 22 in the grid 14 formed of intersecting grid strips 18 and 20. These grid strips 18 and 20 intersect at approximately the center of a channel, indicated generally at 24, having an axis parallel to the fuel rods 16 and defined by the four surrounding fuel rods 16. The flow deflectors and twisters, or cones, 26 and 28 are mounted on the grid strips 18, 20 at the intersections 30 and 32 of the strips. The twisters 26 and 28 are substantially identical with the exception that the deflector and twister 26 is turned 180° from deflector-twister 28. The reason for the different positions will become apparent as the specification proceeds.

As shown in FIG. 1 the grid strips 18 and 20 may be generally straight thin intersecting metal strips of substantial width positioned on edge and may be secured together in any suitable manner and are preferably intermeshed in the manner used in the egg separators in an egg crate in which all the strips running in one direction are slotted downwardly from the upper edge about half their width to receive the strips running in the other direction and the strips running in that other direction are slotted upwardly from the bottom about half their width to receive the strips running in the one direction. Such a structure will provide a grid of intersecting and interengaging grid strips. The grid strip 20 may thus be assembled with the grid strip 18 by pushing the slots in grid strip 20 downwardly through the slots in the grid strip 18. The grid strips may be unslotted and secured together by welding if desired.

The deflectors and twisters of this invention are conical structures indicated at 26 and 28 and as shown are pyramids having substantially flat triangular shaped sides of different sizes. The numbers 1, 2, 3 and 4 in the drawings indicate both the individual side or deflecting surface of the series of sides around the pyramid and also identify the particular quadrant in which that surface is positioned. The grid strips or cross members 18 and 20 which intersect at substantially the center of the flow channels defined by the fuel rods 16 divide the flow channel into four quadrants. One deflector surface of the pyramid is located in each quadrant as shown in FIGS. 2 and 3. As shown in FIG. 3 the pyramid in plan view has a substantially symmetrical configuration. The pyramid has a pointed apex 34, which if desired may be truncated, and a base indicated generally at 36 and has an axis indicated at 38 extending from the apex through substantially the center of the projected base and is positioned to coincide with the intersection 30 of the grid strips 18 and 20. The pyramid may be either of solid construction or preferably may be made up of sheet material. In either case the edge of the base of the pyramid traces a segmented helix and the series of sides or deflecting surfaces of the pyramid increase in length in sequence from side 1 to side 4. Whether the pyramid, which will be called a conical structure or helical cone, is solid or is of sheet material the succeeding sides from 1 to 4 each meet with the preceding side in an edge having the same length as that of the preceding side until the final side edge of side 4 is reached which not only does not have the same length as the first edge of side 1 but does not meet it except at the apex so that the pyramid would really have a fifth side extending radially inward from the point 40 of side 1 to an intersection with the axis 38 and lying in the plane of the grid strip 18 as shown in FIG. 2. If the pyramid is made solid it might, for ease of manufacture, have the base terminate at a common point 92 on the axis 38 adjacent the upper edge of the junction of the grid strips 18 where the pyramid is made to have a length substantially equal to the width of the grid strips as shown in FIG. 7.

The helical cone may be built up of a series of the several individual deflecting surfaces 1, 2, 3 and 4 and attached, as by welding, in proper sequence to the grid strips 18 and 20 to form the assembled cone. In such case the deflector 26 would have the side edge 44 of deflector surface 1 secured to grid strip 18 and longer side edge 46 attached to grid strip 20. Side edge 48 of deflecting surface 2, see FIG. 3, which is of the same length as side edge 46 of deflecting surface 1 would be attached to the opposite side of grid strip 20 and aligned with side edge 46. Longer side edge 50 of deflecting surface 2 would be attached to grid strip 18. Side edge 52 of deflecting surface 3 which is of the same length as side edge 50 is aligned with side edge 50 and attached to the opposite side of grid strip 18. Side edge 54 of deflecting surface 3 is attached to grid strip 20. Side edge 56 of deflecting surface 4 is of the same length as side edge 54 and is aligned therewith and is attached to the opposite side of grid strip 20. Side edge 42 of deflecting surface 4 which is the longest of the several side edges is attached to grid strip 18 but is not aligned with the side edge 44 of deflecting surface 1 but is attached to the opposite side of the grid strip 18 from side edge 44. In this way the helical cone is built up having a common apex 34 and, positioned the same radial distance from the axis, the several base edges 58, 60, 62 and 64 of deflecting surfaces 1, 2, 3 and 4 respectively form a segmented helix. The side corners, or edges, of the helical cone are thus positioned at the grid strips. In passing from deflecting surface 1 to deflecting surface 4 each succeeding side edge of each deflecting surface is longer than the preceding side edge and because the corners of the base edges are all arranged equally distant from the axis of the helical cone the angle that each succeeding side edge makes with the flow stream through the grid and with the axis of the cone, and the intersection 30 of the grid strips, is less than the angle of the preceding side edge which in effect turns or twists the deflector surfaces with respect to the fluid flow and axis. Hence the fluid in the flow stream passing over the deflecting surfaces will not only be forced outwardly from the cone axis and cross member intersection toward the fuel rod but because of the smaller angle on the succeeding side edges will be forced to one side of the axis of the fuel rod and across the rod surface in a spiral around the fuel rod and within the opening in the grid strip and in the opposite rotary direction around the axis of the conical structure.

In the structure just described the sheet metal helical cone is supported by, and the side surface 44 of the deflecting surface 1 is connected to the side surface 42 of the deflecting surface 4 by, means of the grid strip, in the position shown in FIG. 2 by grid strip 18.

It is possible to make the cone up of sheet metal as a separate helical cone entity and then support the cone on the grid strips in the manner described in application Ser. No. 889,548 now U.S. Pat. No. 3,663,367 issued May 16, 1972 filed by me on Dec. 31, 1969 by providing suitable slotted portions in the helical cone for receiving the grid strips 18 and 20 shown in FIG. 5 as slots 66 and 68. In such an independent cone the side edge 44 of deflector surface 1 and the side edge 42 of deflector surface 4 are connected by a substantially radially extending sheet of material, preferably metal, 70.

The helical cone may be made up of several individual pieces welded together or it may be made up of a single sheet metal stamping and then folded into the helical cone shape with the final free edges welded to adjacent parts such as the lower portion of edge 42 being welded to the adjacent portion of web 70. The base may be left open or may be closed in any of several configurations such as an integral or separate single triangular flat plate closing the bases of deflectors 1 and 2 and another integral or separate triangular flat plate closing the bases of deflectors 3 and 4 or the base may be in the form of a pyramid.

The base whether open or closed, flat or conical is relatively unimportant because of its minor effect on flow resistance or turbulence although the conical base might provide reduced turbulence resistance in the flow channel itself.

If desired radially extending flanges such as shown in the above-identified application may be provided at the side corners of the cone to provide greater support and more complete closure of the grid structure. Where the cone is built up as an independent structure the side edges 46 and 48 of deflecting surfaces 1 and 2 are combined to form the corner 72 of the cone, the side edges 50 and 52 of deflecting surfaces 2 and 3 are combined to form the corner 74 of the cone, and the side edges 54 and 56 of deflecting surfaces 3 and 4 are combined to form the corner 76 of the cone.

If desired and as shown in FIG. 6 the helical cone may be made solid and if it is desired to support it on a grid may be slotted as indicated above in connection with the sheet metal cone by suitable slots not shown. Similar parts of the cone are given the same numbers used in describing the sheet metal cone. The radial surface 70 connecting the edges 42 and 44 of the cone is of course of solid material and not of sheet metal as described in the structure of FIG. 5. The base of the solid cone like that of the sheet metal cone is defined by the base edges 58, 60, 62 and 64 and in the structure shown in FIG. 6 has a substantially flat triangular surface 78 connecting edges 58 and 60 and another triangular surface 80 connecting base edges 62 and 64. The sheet metal cone may be provided with similar triangular surfaces but made of sheet metal. This in the solid cone will provide a substantially longitudinally extending radial surface containing the axis 38 and numbered 82 and connecting the surfaces 78 and 80, the edge 42 of deflecting surface 4 at the junction of the edge 74 and the base of the cone. If desired the sheet metal cone may be provided with a similar surface 82 of sheet metal but such a surface will usually be provided by the grid strip.

FIG. 7 shows a solid cone similar to that shown in FIG. 6 but with a modified base structure. Similar parts are indicated by numbers the same as those used in describing the structure of FIG. 5 and FIG. 6. In the modification shown in FIG. 7, instead of leaving the base substantially flat it is made in the shape of a cone or pyramid provided by four substantially triangular surfaces 84, 86, 88 and 90 connecting the respective base edges 58, 60, 62 and 64 with a common meeting point or apex 92. In this case the longitudinally extending radial surface 82 will be much smaller and will not extend to the axis 38 but will connect the edge 42 of deflecting surface 4 with the adjacent edge of the triangular base surface 84 and the adjacent edge of the triangular base surface 90. This solid cone can also be slotted in the manner shown in the above-identified application if it is desired to support it on a grid formed of intermeshing grid strips.

With the helical cone, either solid or of sheet material, supported in the center of the flow channel between the fuel rods, fluid flow will be deflected outward toward the fuel rods and the flow in the channel will be given a clockwise rotation in the channel itself with the cones arranged in the sequence shown in FIGS. 2 and 3. With the cones 28 arranged on diagonally opposite sides of a selected fuel rod 16 and the cones 26 which are oriented at 180° from the cones 28, arranged at the two other diagonally opposed positions with respect to the fuel rod the several deflecting surfaces within a grid opening 22 will then be arranged in sequence around the fuel rod 16 so as to provide a counterclockwise rotation with the cones arranged as shown in FIG. 3. The deflection of the cooling fluid radially inward by the several deflecting surfaces toward and to one side of the axis of the fuel rod and the imparting of a spiral motion to the fluid will provide the desired scrubbing and turbulent action to increase the cooling effect of the cooling fluid. The counterclockwise rotation around the fuel rods will assist the clockwise rotation around the center of the fluid flow channels and thus tend to increase the mixing and the turbulence of the cooling fluid.

In the now-preferred embodiment the junctions of the side edges with the base edges are arranged an equal radial distance from the axis 32 of the cone (FIG. 3). The junction of the side edge 44 and the base edge 58 (FIGS. 4 and 5) is one-half of the vertical height of the grid strip or one-half of the vertical height of the junction of the base edge 64 and the side edge 42 of deflector surface 4 from the apex 34 of the cone where the over-all height of the cone is equal to the width of the grid strip. The junction of the base edges 58 and 60 and the side edges 46 and 48 (FIG. 3) of the deflecting surfaces or the corner 72 of the cone is five-eighths of the width of the grid strip. The junction of the base edges 60 and 62, the side edges 50 and 52 or the corner 74 of the cone is three-fourths of the width of the grid strip or the total height of the cone and the junction of the base edges 62 and 64 and the side edges 54 and 56 or the corner of the cone 76 is arranged at seven-eighths of the width of the grid strip or the total height of the cone. With this arrangement and with the cones arranged as shown in FIG. 3 the maximum projection of the deflecting surface 1 will occur at a point further upstream than the maximum projection of any of the other deflecting surfaces and as a maximum projection of each succeeding deflecting surface in the series if positioned further downstream than the succeeding one it will be apparent that the total restriction to the flow will be less than would be the case if all the maximum projections were at the same downstream position. Stated in another way, the cross sectional flow area at any longitudinal position within the grid opening is greater than would be the case where the maximum projection is all at the same downstream position.

Figure 8:
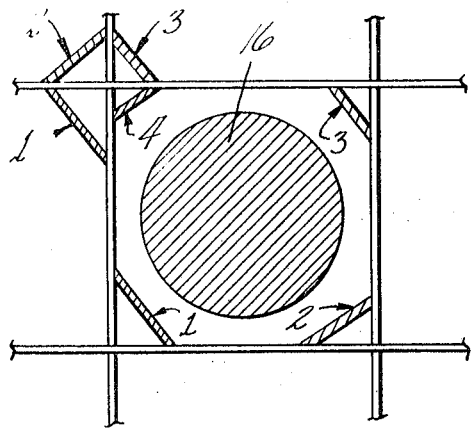
FIG. 8 is a section view on line 8—8 of FIG. 4.

This feature is illustrated in FIGS. 8-11 which are cross sections through the grid and cones progressively further downstream. FIG. 8 shows surface 1 at substantially maximum projection into the opening 22 and from the intersection 30 and axis 38 of the conical structure. Each of the surfaces 2, 3 and 4 project much less and hence create less flow resistance.

Figure 9:
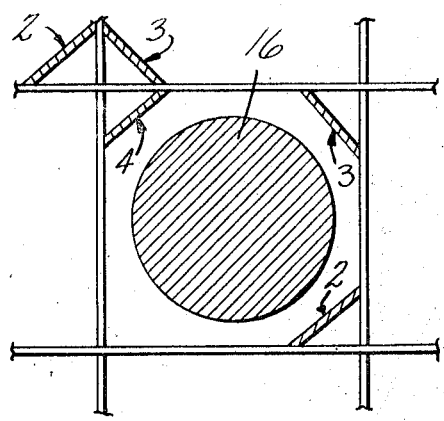
FIG. 9 is a section view on line 9—9 of FIG. 4.

FIG. 9 shows the surface 2 at substantially its maximum projection. Surface 1 is no longer present having terminated further upstream and surfaces 3 and 4 still produce less than maximum flow resistance.

Figure 10:
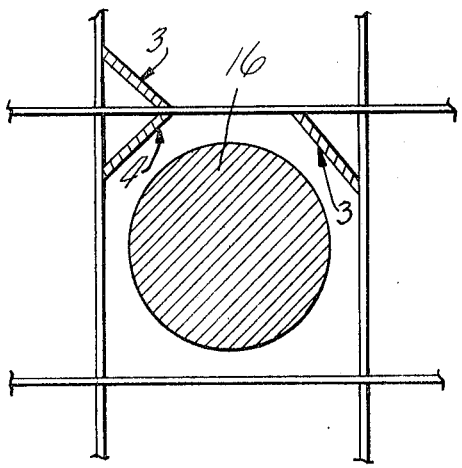
FIG. 10 is a section view on line 10—10 of FIG. 4.

FIG. 10 shows surface 3 at substantially maximum projection with surfaces 1 and 2 having terminated further upstream and surface 4 still at less than maximum flow resistance.

Figure 11:
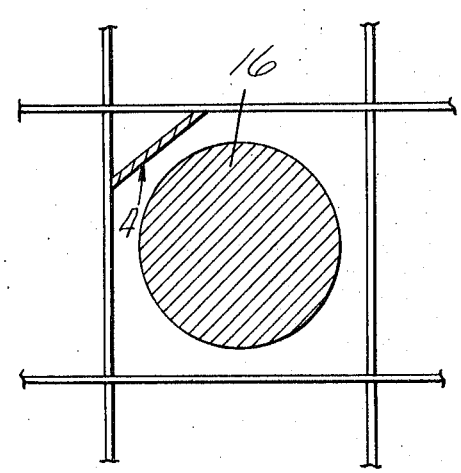
FIG. 11 is a section view on line 11—11 of FIG. 4.

FIG. 11 shows that all the deflector surfaces except surface 4 have terminated further upstream and provides the least obstruction to flow of any of the illustrated sections.

A cross section of each cone is shown in the upper left hand portion of each FIGS. 8-11 from which it will be appreciated that in the example chosen the progressive downstream termination of the deflector surfaces along the cone and within the grid opening will provide an efficient deflector with a low over-all resistance to flow.

If desired the resistance to flow may be further reduced over the example illustrated by snubbing off the apexes of each succeeding surface or moving the apexes of each succeeding surface in the series further downstream so that surface 1 would terminate upstream of say surface 3 apex so that a sectional view at the level of FIG. 8 would show only surfaces 1 and a portion of surface 4. Such a construction would still provide a conical structure, which could be solid, built up of several pieces or made from a single sheet stamping bent into the desired form with the final two free side edges secured together, and would have the advantages described for the now-preferred embodiment.

While the deflecting surfaces have been shown as flat, they may be curved if desired.

It will be understood that the helical cones shown and described herein are merely illustrative and that changes may be made without departing from the scope of the invention as claimed.

What is claimed is:

1. A nuclear fuel assembly comprising a plurality of longitudinally extending fuel elements forming longitudinally extending cooling flow channels therebetween and adapted to have a fluid coolant flow in one direction therethrough longitudinally of said fuel elements, flow deflectors in said channels, each deflector comprising a conical structure pointed upstream, having a series of circumferentially and sequentially arranged deflector surfaces and with each surface slanted with respect to said longitudinal flow toward said fuel elements so as to direct flow against the sides of said fuel elements and twisted with respect to said flow so as to impart a rotary motion to said flow, a grid of intersecting cross members extending transversely of said fuel elements, defining openings receiving said fuel elements and intersecting in said channels with the conical structures supported by said grid at the intersections of said cross members with a deflector surface in each opening around an intersection and in which the deflectors are arranged in said openings around said fuel elements so as to impart a rotary motion to the fluid around the elements.

2. A nuclear fuel assembly comprising a plurality of longitudinally extending fuel elements forming adjacent longitudinally extending coolant flow channels therebetween, said channels adapted to have a fluid coolant flow in one direction therethrough longitudinally of said fuel elements, flow deflectors in said channels, each deflector comprising a conical structure having a series of circumferentially and sequentially arranged deflector surfaces, each deflector surface having a base edge portion, and each succeeding surface of said deflector having a base edge spaced longitudinally of said element from the base edge of the preceding surface, a grid for supporting said conical structures in said channels, said grid comprising intersecting cross members extending transversely of said fuel elements and defining openings for receiving said fuel elements and intersecting in said channels with the conical structures positioned at the intersection pointed upstream, and said deflector surfaces being triangular and having side edges with one side edge positioned at a greater angle to the axis of said channel than the other side edge to induce a spiral twist in one direction to flow in said channel, and said cross members forming corners in said openings and one deflector surface being positioned in each corner with the conical structures oriented to provide a sequence of deflector surfaces circumferentially in said opening to impart a twist to the flow around said fuel elements in the opposite rotary direction.

3. A nuclear fuel assembly comprising a plurality of longitudinally extending fuel elements forming adjacent longitudinally extending coolant flow channels therebetween, said channels adapted to have a fluid coolant flow in one direction therethrough longitudinally of said fuel elements, flow deflectors in said channels, each deflector comprising a conical structure having a series of circumferentially and sequentially arranged deflector surfaces, each deflector surface having a base edge portion, and each succeeding surface of said deflector having a base edge spaced longitudinally of said element from the base edge of the preceding surface, a grid for supporting said conical structures in said channels, said grid comprising intersecting cross members extending transversely of said fuel elements and defining openings for receiving said fuel elements and intersecting in said channels with the conical structures positioned at the intersection pointed upstream, and said deflector surfaces being of different sizes and arranged in a series in sequence from the smallest to the largest and forming the deflector sides of the conical structure, and the base edges of the succeeding surfaces of the series being each spaced longitudinally in the same direction from the base edge of the preceding surface so that the maximum obstruction to flow of each of said surfaces is at a different longitudinal position with respect to said flow from each other surface of said conical structure and in said opening.

4. A nuclear fuel assembly comprising a plurality of longitudinally extending fuel elements forming adjacent longitudinally extending coolant flow channels therebetween, said channels adapted to have a fluid coolant flow in one direction therethrough longitudinally of said fuel elements, flow deflectors in said channels, each deflector comprising a conical structure having a series of circumferentially and sequentially arranged deflector surfaces, each deflector surface having a base edge portion, and each succeeding surface of said deflector having a base edge spaced longitudinally of said element from the base edge of the preceding surface, a grid for supporting said conical structures in said channels, said grid comprising intersecting cross members extending transversely of said fuel elements and defining openings for receiving said fuel elements and intersecting in said channels with the conical structures positioned at the intersection pointed upstream, and said flow deflector being pyramidal and having a central axis coinciding with said intersection, and said deflector surfaces being triangular and each surface having two side edges, one side edge arranged at a different angle to said axis than the other side edge to impart a twist to fluid flow passing through said grid.

* * * * *